(12) United States Patent
Barton et al.

(10) Patent No.: US 9,807,064 B2
(45) Date of Patent: Oct. 31, 2017

(54) DISTRIBUTED BACKUP AND RETRIEVAL SYSTEM

(71) Applicant: TiVo Solutions Inc., San Carlos, CA (US)

(72) Inventors: James Barton, Alviso, CA (US); Brain Beach, Columbus, IN (US); Adam Feder, Mountain View, CA (US)

(73) Assignee: TiVo Solutioins Inc., San Carlos, CA (US)

( * ) Notice: Subject to any disclaimer, the term of this patent is extended or adjusted under 35 U.S.C. 154(b) by 0 days.

(21) Appl. No.: 15/012,796

(22) Filed: Feb. 1, 2016

(65) Prior Publication Data
US 2016/0156601 A1    Jun. 2, 2016

Related U.S. Application Data

(63) Continuation of application No. 12/016,773, filed on Jan. 18, 2008, now Pat. No. 9,251,012.

(51) Int. Cl.
*G06F 7/00* (2006.01)
*H04L 29/06* (2006.01)
(Continued)

(52) U.S. Cl.
CPC ...... *H04L 63/0428* (2013.01); *G06F 11/1458* (2013.01); *G06F 11/1464* (2013.01);
(Continued)

(58) Field of Classification Search
CPC ............. G06F 11/1464; G06F 11/1451; G06F 11/1469; G06F 2201/80; H04L 63/0428
(Continued)

(56) References Cited

U.S. PATENT DOCUMENTS

| 5,771,354 A | 6/1998 | Crawford |
| 6,038,665 A | 3/2000 | Bolt et al. |

(Continued)

FOREIGN PATENT DOCUMENTS

| JP | 2002-236605 | 8/2002 |
| JP | 2005-107770 | 4/2005 |
| WO | WO 2007/111086 A1 | 10/2007 |

OTHER PUBLICATIONS

United States Patent and Trademark Office, U.S. Appl. No. 12/016,773, Non-Final Office Action dated May 5, 2014.

(Continued)

*Primary Examiner* — Kannan Shanmugasundaram
(74) *Attorney, Agent, or Firm* — Haley Guiliano LLP

(57) ABSTRACT

A method is provided for performing distributed backup and retrieval of data. Data is sent by a plurality of client devices to be processed by a server and then stored in a database. A subset of the processed data stored in the database is backed up to each of the plurality of client devices. For the one or more particular client devices owned by a user, the subset of processed data stored on the one or more particular client devices is the subset of processed data that is associated with the user. The server and client device is updated to maintain the same state of processed data in the database and the backup. In the event of failure of either the database or a client device, processed data may be restored using the processed data stored on the database or the backup stored on the plurality of client devices.

21 Claims, 6 Drawing Sheets

(51) Int. Cl.
*H04L 29/08* (2006.01)
*G06F 17/00* (2006.01)
*G06F 11/14* (2006.01)

(52) U.S. Cl.
CPC .......... *G06F 11/1469* (2013.01); *H04L 67/32* (2013.01); *G06F 11/1451* (2013.01); *G06F 2201/80* (2013.01); *G06F 2201/84* (2013.01)

(58) Field of Classification Search
USPC ................................................ 707/652, 679
See application file for complete search history.

(56) References Cited

U.S. PATENT DOCUMENTS

| | | | |
|---|---|---|---|
| 6,883,110 | B1 | 4/2005 | Goddard |
| 6,898,603 | B1* | 5/2005 | Petculescu ........ G06F 17/30902 707/600 |
| 9,251,012 | B2 | 2/2016 | Barton et al. |
| 2001/0034737 | A1* | 10/2001 | Cane ................... G06F 11/1451 |
| 2002/0087588 | A1 | 7/2002 | McBride et al. |
| 2003/0182326 | A1 | 9/2003 | Patterson |
| 2003/0188153 | A1* | 10/2003 | Demoff ............... G06F 11/2069 713/153 |
| 2004/0205110 | A1 | 10/2004 | Hinshaw |
| 2005/0050067 | A1* | 3/2005 | Sollicito ........... G06F 17/30902 |
| 2005/0131990 | A1 | 6/2005 | Jewell |
| 2008/0101763 | A1* | 5/2008 | Bhogal .................. H04N 5/782 386/291 |
| 2009/0187609 | A1 | 7/2009 | Barton et al. |

OTHER PUBLICATIONS

United States Patent and Trademark Office, U.S. Appl. No. 12/016,773, Non-Final Office Action dated May 22, 2015.
United States Patent and Trademark Office, U.S. Appl. No. 12/016,773, Notice of Allowance dated Sep. 15, 2015.
Canadian Patent Office, Application No. 2,710,925, Foreign Office Action dated Mar. 4, 2013.
Canadian Patent Office, Application No. 2,710,925, Pending Claims as of Mar. 4, 2013.
Chinese Patent Office, Application No. 200980102518.3, Foreign Office Action dated Dec. 3, 2012.
Chinese Patent Office, Application No. 200980102518.3, Foreign Office Action dated May 29, 2013.
Chinese Patent Office, Application No. 200980102518.3, Foreign Office Action dated Mar. 24, 2014.
Chinese Patent Office, Application No. 200980102518.3, Foreign Office Action dated Sep. 18, 2015.
Chinese Patent Office, Application No. 200980102518.3, Pending Claims as of Dec. 3, 2012.
Chinese Patent Office, Application No. 200980102518.3, Pending Claims as of May 29, 2013.
Chinese Patent Office, Application No. 200980102518.3, Pending Claims as of Mar. 24, 2014.
Chinese Patent Office, Application No. 200980102518.3, Pending Claims as of Sep. 18, 2015.
European Patent Office, Application No. 09702115.8, Extended European Search Report dated Feb. 13, 2012.
European Patent Office, Application No. 09702115.8, Office Action dated Feb. 6, 2013.
European Patent Office, Application No. 09702115.8, Pending Claims as of Feb. 13, 2012.
European Patent Office, Application No. 09702115.8, Pending Claims as of Feb. 6, 2013.
Japanese Patent Office, Application No. 2010-543175, Foreign Office Action dated Aug. 14, 2012.
Japanese Patent Office, Application No. 2010-543175, Pending Claims as of Aug. 14, 2012.
U.S. Appl. No. 09/807,574, filed Jun. 22, 2001, Yuen.
Chinese Patent Office, Application No. 200980102518.3, Foreign Office Action dated Aug. 26, 2016.
Chinese Patent Office, Application No. 200980102518.3, Pending Claims as of Aug. 26, 2016.

* cited by examiner

DISTRIBUTED BACKUP AND RETRIEVAL SYSTEM

PRIORITY CLAIM

This application claims benefit under 35 U.S.C. §120 as a Continuation of application Ser. No. 12/016,773, filed Jan. 18, 2008, the entire contents of which is hereby incorporated by reference as if fully set forth herein. Applicant hereby rescinds any disclaimer of claim scope in the parent application(s) or the prosecution history thereof and advise the USPTO that the claims in this application may be broader than any claim in the parent application(s).

FIELD OF THE INVENTION

The present invention relates to backing up data on enterprise systems, more specifically backing up server data across a plurality of client devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The introduction of the DVR to the consumer world has revolutionized the way users watch and record television programs. DVRs record television programs on a hard drive that is capable of storing a large number of television programs. A DVR's user can instruct the DVR to schedule, for recording, specified content that may be broadcast or otherwise transmitted to the DVR at some future time. For example, the user may instruct the DVR to record unspecified content that will be broadcasted on a specified channel beginning at a specified date and time and ending at another specified time. For another example, the user may instruct the DVR to record a specified showing (on a specified channel, and beginning at a specified date and time) of a specified movie, specified event, or specified episode of a multi-episode television series.

A service provider of a DVR service may store data related to a particular user in a centralized server in order to provide particular services. For example, a user might instruct, through a remote interface (e.g., through a website), the user's DVR to record all episodes of a multi-episode television series on a specified channel. Under this circumstance, data regarding the instructions for the recordings are processed by a central server and then stored in the central server for the particular user. The central server sends the data regarding the instructions for recordings to the user's DVR in order for the DVR to record the requested content.

The use of a central server to provide services has become far more widespread, especially with use of the Internet. For example, in addition to DVR services, services with other personal or mobile devices, such as the cell phone, are becoming more common. With the addition of these centralized services to every day life, backing up data to provide these services has become more critical.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
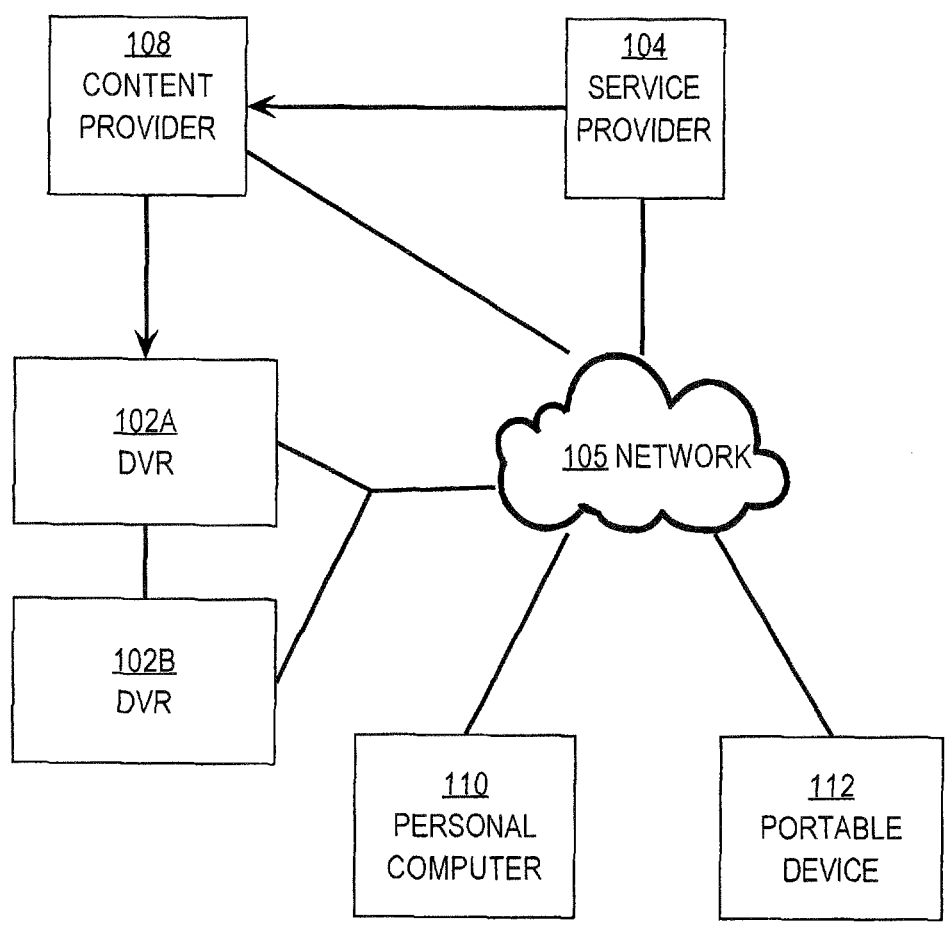
FIG. 1A illustrates an example system in which distributed backup and retrieval may be implemented, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural Overview
   3.0 Distributed Backup for a DVR Service Provider
      3.1 Data Conflicts and Policies
      3.2 Types of Data Stored
      3.3 Privacy and Encryption
      3.3 Data Retrieval
   4.0 Distributed Backup on Enterprise Systems
   5.0 Implementation Mechanisms

1.0 General Overview

The needs identified in the foregoing Background, and other needs and objects that will become apparent from the following description, are achieved in the present invention, which comprises methods to perform distributed backup and retrieval.

In order to provide certain features of a DVR service, a service provider may maintain data in a centralized location. As used herein, "maintaining" data may refer to any of processing, storing, retrieving, and modifying data used to provide services. The data may originate from a particular user and allows the service provider to perform specific services for the particular user. For example, a user might instruct their DVR to record a first run movie on a specified channel without specifying the dates or times at which the movie will be broadcast. Under this circumstance, data regarding the recordings are processed by at least one server and then maintained by the one or more servers for the particular user with the service provider.

In the circumstance where numerous services are offered to thousands of users, the amount of data that is maintained becomes extremely large. Maintaining the data is critical because without the data, the DVR service cannot be adequately provided. Thus, having a backup system is an important facet of any data storage system so that, in cases of catastrophic failure or loss of the central data, data may be recovered. As used herein, "corruption" of the data may refer to complete or partial loss of data, errors that do not allow reading, retrieving, or modifying of data, or any event that causes impacts to accurate maintenance of data.

Storing and backing up large amounts of data occurs in many enterprise systems, as well as with providers of DVR services. These large amounts of data may be stored in databases on storage devices in a data center that are controlled by one or more servers. As used herein, a data center houses a large number of storage devices that holds information about many different users. Storage devices may include disk drives and tape drives. The data center may be located in a single geographic region.

In one backup system, each database is replicated on a standby database. If the centralized set of data is corrupted in any way, then the data may be restored from the standby database. This backup system protects against data loss in many scenarios. For example, should a database fail because of a power surge or failed hard disk, the data stored on the database may be used from the standby database and service may be continued with little interruption.

However, a local standby system may not be used in the situation where corruption occurs in the central set of data and the standby database simultaneously. For example, if the data center where the central data and the standby database are located sustains major damage, such as in an earthquake or hurricane, then both the central data and backup databases would be destroyed. For this reason, the standby, or backup database, may be located in a geographically distinct region from the data center.

Unfortunately, higher costs, e.g. economic and in gross man-hours, are associated with storing the central data in a data center and storing the backup database in another geographically distinct location. Costs of the land, utilities, and operations for the backup location are costs that are not encountered when only a single data center is maintained. In addition, storing the backup database at a remote facility is more time intensive. Procedures must be generated to coordinate activities in two locations to maintain the backups correctly. Also, errors in the backups may be more difficult to detect while maintaining two facilities.

There are additional problems with maintaining a data center for central data and a remote backup facility. Transmitting data may cause privacy concerns as sensitive customer data may be intercepted during the transfer. Also, if data are stored in two locations, then one location may be adequately secured from data intrusion but the other location may be left prone to intrusion attacks.

Storing backups to a database has become more expensive and time intensive as the amount of data has increased dramatically and the complexities of maintaining a remote backup facility are realized. In a distributed network, as used by a DVR service provider, a central server processes data sent from numerous clients and then may store that processed data in a database. In an embodiment, rather than the central server storing backups of the processed data onto a single, large backup database, the central server may store the backup in a distributed manner, with portions or subsets of the processed data backed up onto the clients themselves.

In an embodiment, users may own one or more clients and keep these clients in their homes. The subset of processed data backed up on the one or more clients owned by a user is the subset of processed data that is associated with the user or the user's specific client device.

Performing distributed backups offers many advantages over storing backups on a single, large database. Backing up processed data associated with a user to their own client is more cost effective and easier to maintain. The costs of maintaining a separate backup either on-site or at a remote facility are avoided. The data backed up to a client up may be more current than backups made to a single database. For example, the data stored on the client device may be updated with the data on the central server multiple times in a single day, but data backed up to a single database may only be updated once per day. Also, backing up data associated with a user or client to that user's own client removes privacy issues as the user's data is backed up to their own device, not stored in a remote location with many other users' information.

2.0 Structural Overview

FIG. 1A illustrates an example system on which distributed backup and retrieval may be implemented, according to an embodiment. The system contains DVR 102A and DVR 102B which are communicatively coupled to network 105 through any communication interface, such as an Ethernet interface or wireless communications port. The functionality of a DVR is typified in U.S. Pat. No. 6,233,389 which is owned by the Applicants and is hereby incorporated by reference. The system also includes service provider 104, content provider 106, personal computer 108 and portable device 110.

Personal computer 108 may be a personal computing device, such as a desktop computer or laptop computer, and is also coupled to network 105 through any communications interface, including wireless. Portable device 110 may be any handheld computing device, cellular phone, portable media player, or any other portable device capable of displaying multimedia content and is also coupled to network 105 through any communications interface, including wireless. DVRs 102A and 102B, personal computer 108, and portable device 110 each communicate with service provider 104 through network 105. In another embodiment, DVRs 102A and 102B, personal computer 108, and portable device 110 each communicate with content provider 110 through network 105.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite or wireless links, etc. Alternatively or additionally, any number of devices connected to network 105 may also be directly connected to each other through a communications link.

In one embodiment, content provider 106 provides broadcast program content to DVRs 102A and 102B via cable, satellite, terrestrial communication, or other transmission method. Broadcast program content may include any multimedia content such as: audio, image, or video content. In another embodiment, content provider 106 provides multimedia content, such as any downloadable content, through network 105 to DVRs 102A and 102B, personal computer 108, or portable device 110.

In one embodiment, DVRs 102A and 102B communicate with service provider 104, which provides program guide data, graphical resources (such as fonts, pictures, etc.), service information, software, advertisements, event identification data, and other forms of data. The data enable DVRs 102A and 102B to operate independently of service provider 104 to satisfy user interests.

In another embodiment, content provider 106 may provide, to service provider 104, content data or any metadata, including promotional data, icons, web data, and other information. Service provider 104 may then interpret the metadata and provide the content data metadata to DVRs 102A and 102B, personal computer 108, or portable device 110.

Figure 1B:
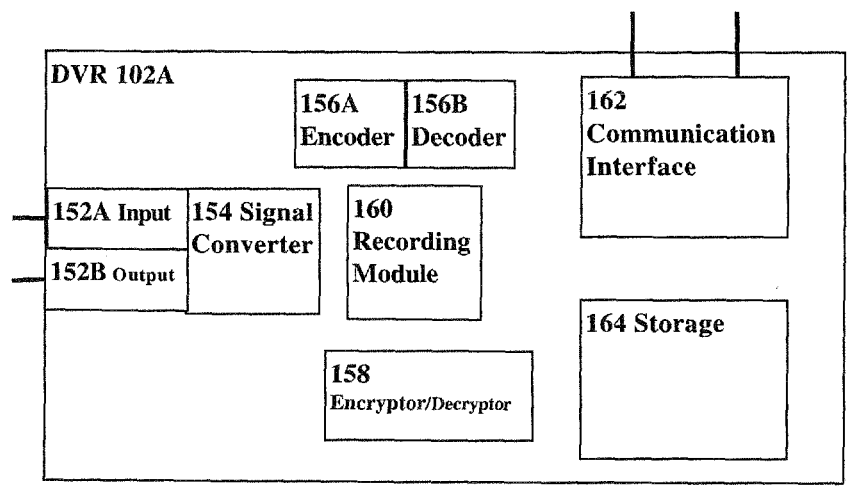
FIG. 1B is a block diagram illustrating a general overview of the components of a Digital Video Recorder (DVR), according to an embodiment of the invention.

Referring to FIG. 1B, in an embodiment, DVR 102A (DVR 102B contains the same components and performs the same functions) generally comprises a plurality of components, signified by Signal Converter 154, that are necessary to digitize an analog television signal and convert it into a digital data stream or accept a digital data stream. DVR 102A receives broadcast signals from an antenna, from a cable TV system, satellite receiver, etc., via Input 152A. Input 152A may comprise a plurality of tuning modules that allow a plurality of signals to be received and recorded simultaneously.

Recording Module 160 records the incoming data stream by storing the digital data stream on at least one storage facility, signified by Storage 164 that is designed to retain segments of the digital data stream. Storage 164 may also be used to store backups of processed data that are associated with the user of the DVR. A Signal Converter 154 retrieves segments of the data stream, converts the data stream into an analog signal, and then modulates the signal onto a RF carrier, via Output 152B, through which the signal is delivered to a standard TV set or receiving device. Output 152B may alternatively deliver a digital signal to a TV set or display monitor. For example, DVR 102A may utilize a High-bandwidth Digital Content Protection (HDCP) port for sending digital signals to a TV via a HDMI cable.

DVR 102A also includes a Communication Interface 162, through which DVR 102A communicates with Network 105 via Ethernet, wireless network, modem, or other communications standard. Further, DVR 102A may be integrated into a TV system such that the components described above are housed in a TV set capable of performing the functions of each component of DVR 102A.

In another embodiment, DVR 102A generally comprises a plurality of components necessary to receive, record, store, transfer, display, and playback digital data signals from a plurality of sources, such as a PC, a DVR, a service provider, or content server. DVR 102A can transfer digital data signals to another DVR, portable device, or PC. This may be seen in FIG. 1A with a connection between DVR 102A and DVR 102B enabling communication between the two DVRs. DVR 102A may encode or decode digital signals via Encoder 156A and Decoder 156B into a plurality of formats for playback, display, storage or transfer. DVR 102A can also encrypt or decrypt digital data signals using Encryptor/Decryptor 158 for storage, transfer, display, or playback of the digital data signals.

In one embodiment, DVR 102A communicates with Service Provider 103, which provides program guide data, graphical resources such as brand icons and pictures, service information, software programs, advertisements, and other forms of data that enable DVR 102A to operate independently of the Service Provider 104 to perform autonomous recording and display functions. Communication between DVR 102A and Service Provider 104 utilizes a secure distribution architecture to transfer data between DVR 102A and the Service Provider 104 such that both the service data and the user's privacy are protected.

3.0 Distributed Backup for a DVR Service Provider

In an embodiment, backups for a DVR service provider are stored in a distributed manner at client devices. DVR service is provided by a service provider in a distributed network. A central server processes data sent from numerous client devices, and then stores that processed data in order to provide the DVR service. As used herein, a "central server" may refer to one or more servers that process data. The central server may store the processed data in a primary database. As used herein, a "primary database" may refer to one or more databases to which the central server stores, retrieves, or modifies data. As used herein, "client devices" may refer, but is not limited to, DVRs, mobile devices, or personal computers. Mobile devices are any device that may be designed for portability and may be powered using batteries. Mobile devices include, but are not limited to, cell phones, PDAs, portable video players, portable music players, portable media players, or portable DVRs.

In an embodiment, the central server stores a backup of the central database in a distributed manner, with subsets of the processed data backed up onto the client devices themselves. Users may own one or more client devices and keep these clients in their homes or offices. The subset of processed data backed up on the one or more clients owned by a user is the subset of processed data that is associated with the user or the specific client device.

Figure 2:
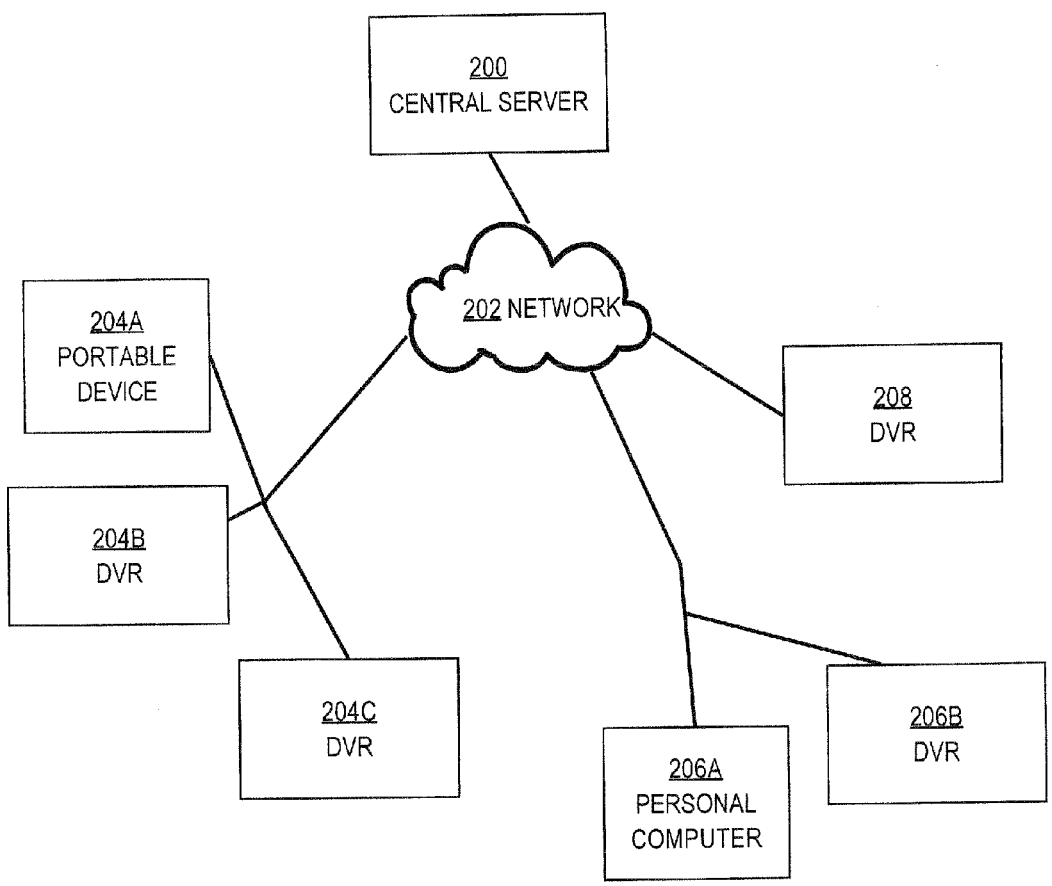
FIG. 2 is a diagram illustrating multiple client devices/DVRs connected to a central server, according to an embodiment of the invention.

An example of a central server and primary database connected to client devices is illustrated in FIG. 2. In FIG. 2, a central server 200 with a primary database is connected to a plurality of client devices via network 202. Portable device 204A, DVR 204B, and DVR 204C represent three client devices that are owned by the same user. Personal computer 206A and DVR 206B represent two client devices that are owned by the same user and connected to central server 200 by network 202. DVR 208 is a single client device connected to central server 200 by network 202.

In an embodiment, a backup of processed data is made by determining, for each client device, which subset of data of the data stored on the central server's database should be stored in a particular client device. The determination of the subset of data may be based upon any of a number of factors, including, but not limited to, the user who owns a particular client device, the encryption available on a particular client device, or space available on a particular client device. The determination of the subset of data varies from implementation to implementation. Once the determination of the subset of data is made, the subset of data is then sent to and stored on the particular client device.

One method that may be used to perform backups and subsequent updates of backup data is synchronization. As used herein, "synchronization" refers to maintaining data in the same state that is located in two separate locations. Synchronization may be initiated by either the central server or any of the client devices. For example, processed data might be stored in the primary database and also a client device. Synchronization is performed such that the subset of data stored in the client device is in the same state as the corresponding data stored in the primary database.

Synchronization may be used so that the state of data remains consistent within the primary database and the backup. The backup destination in this scenario is the client device itself. In an embodiment, any synchronization protocol may be used by the backup system. The synchronization protocol is the procedure followed in order to ensure that backup data accurately reflects the data in the primary database.

In an embodiment, backups are updated between the central server and the client devices many times throughout the day. When backups are made to a single, large database, the backups may be done only once per day because of the amount of data that must be stored and transmitted. In an embodiment of the distributed backup, the backup is stored in smaller increments and may be performed more frequently with no additional effort because backups are asynchronous events that are related to information changing on a per client basis. Increased updates result in the data stored as backup in client systems having more integrity, or more likely to be more current, than data stored with less updates. In another embodiment, updates occur whenever a change in data is detected as a result of actions by the user. Under this circumstance, many updates might occur if the user performs a large number of actions, but few updates might occur if the user is less active. In another embodiment, updates only occur periodically upon client communication with the service even when a user performs a large number of actions. In any scenario, the data stored as backup remains as current with the data stored in the primary database based upon the last update.

In an embodiment, requests sent from the client device to the server have ascending identification numbers which identify the state of the data stored on the client device. In another embodiment, requests sent from the server to the client device also have ascending identification numbers which identify the state of the data stored on the primary database. For example, a request from a client device to the server might have the identification number 1005. Once the server receives the request, the server examines the information that is stored in association with that particular user. If the server contains information from request 1004, then the server would request only the specific information on the client device that is different from the information stored on the primary database. Because the identification numbers are sequential and ascending, the fact that the identification number only increased by one would indicate that the states of the data on the client device and the primary database may not differ by much. If the difference in the identification numbers is larger, then changes in the states of data may be more significant.

If the request from the server or the client device has a lower number than the recipient of the request, then this indicates that the server or client making the request has older data than the recipient. In this scenario, no data update may take place or updated data may be transmitted by the recipient of the request with the more current data, to the server or client device, in order to update the older data. If the recipient of a request is unable to match a request to a user, then this indicates that the recipient may not yet store that particular data, or that the particular subset of data has been lost. In this case of no match found, a transfer of all data would be performed to the recipient server or client for the particular user making the request.

In an embodiment, data transfers may be made in a full transfer or a partial transfer. In a full transfer, all data for a particular user is sent to the database from a client device. This may occur where there is no information found for that particular user, as in the case of server failure or catastrophic data loss. There may also be a partial transfer that does not send the entire data record but only transmits the changes between two sources of data.

Figure 3:
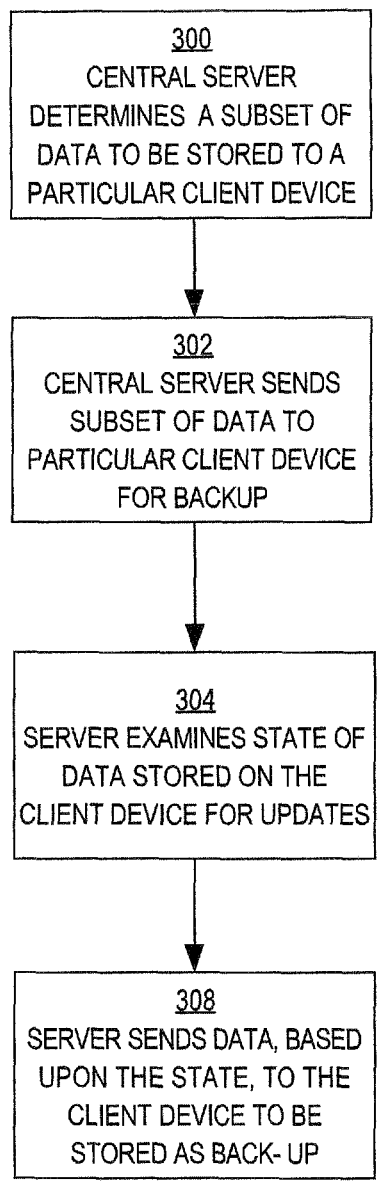
FIG. 3 is a diagram of a flow chart illustrating steps to perform a backup of data to a client device, according to an embodiment of the invention.

The steps of storing a backup to a client device, according to an embodiment of the invention, are illustrated in FIG. 3. In step 300, the central server determines the subset of data of the data stored on the primary database to store to a particular client device as backup. The subset of data stored may be the subset associated with a particular user who owns the client device or particular users that share the device (e.g. a family of four has different user profiles relating to the device). Then, in step 302, the central server sends the subset of data earlier determined to the particular client device for backup. In step 304, the server examines the state of the data stored in the backup. The state may be indicated by a non-decreasing number with a higher number associated with more recent data than a lower number. In step 308, the server sends data to the client device to update the backup data. The data sent by the server is based upon the state of the data on the client device. If the states are close, then little data might be updated. If the states are very different, more data may be sent to update the backup data.

3.1 Data Conflicts and Policies

In the case of data conflicts with the server and the client, a policy controls what information is stored in the database. As used herein, a "policy" is an instruction that dictates what particular data are to be stored in the database when there is more than one set of data that may be stored. The policy might be that only the newest information, regardless of the source is to be stored in the backup. Other policies may include, but are not limited to, that information sent from the client device is the information that is most up-to-date and that the client always overwrites data that is stored in the database.

In an embodiment, the policy is exclusively controlled by the server. With the server in control of the policy, the complexity of the backup system is kept within the server. This shields the client device from the complexity of implementing policies. In addition, if the policy ever needs to be amended, then only the server has to be updated and not every single client device relying on the server. In another embodiment, the client device may be in exclusive control of the policy. In yet another embodiment, the policy is controlled by both the server and the client device and in scenarios with conflicting information, the server and client device negotiate with each other in order to determine which data is to be stored.

3.2 Types of Data Stored

In an embodiment, the data stored in the backup is only the data that is necessary for the server to operate correctly. Thus data that only relates to the operation of the server and data that are associated with a particular user(s) are stored as backup data in the client device.

In an embodiment, backups may include only metadata of content data. As used herein, metadata may refer to, but is not limited to, a list of recordings made, recording times, instructions to record first-run or repeat episodes of a television show, lists of downloaded or purchased content, high scores of games played on the client device, user specified preferences, observed user preferences, season passes, user personal information (credit card information, home address, shipping address, other account information, etc.), and ratings of particular recordings. This metadata allows the service provider to perform DVR services for a user.

In another embodiment, backups may be made of the content and the metadata associated with the content. As used herein, content may include, but is not limited to, broadcast content, video, downloadable content, games, music, and any other media that may be experienced by a user that is playable or displayable by the client device.

In an embodiment, each client device owned by the user is used to store a backup of data pertaining to the user. This redundancy is practiced so that if one client device fails at the same time as the primary database, then the data is still stored in another client device and may be recovered from that client device. One is not limited to storing the backup only to a DVR client device. The backup may be stored on a personal computer client device or a mobile client device owned by the user. Also, backups of metadata only or content and metadata may be backed up to other client devices owned by the user.

In an embodiment, the type and amount of data to be stored may be dependent upon the form of transmission of data between the client devices and the server. The transmission of data between the client devices and the server may be through a high speed broadband network or through low bit-rate methods, such as by phone line. If the server detects that the connection between the client device and server is through a low-speed phone line, then the amount of data stored as backup may be a minimal amount. If the connection between the client device and the server is through a high speed broadband network, then more data may be stored as backup and may include more types of data such as content.

3.3 Privacy and Encryption

Because the information that is being backed up to a particular user's client device is data associated with that particular user or users that share the client device, the issue of privacy for the user is lessened. For example, if there were two client devices, one owned by user A and another by user B, user A's own information would backed up on user A's own client device and user B's information would be backed up only on user B's client device. In an embodiment, there is no personal information for one user associated with one client device stored in another user's client device. In another embodiment, data with personal information is stored with secure encryption on another user's client device.

In an embodiment, the data stored on a client device may include sensitive information such as user information including address or financial data. Financial data may include, but is not limited to, credit card information used to make purchases, account information, and other financial data. If sensitive data is backed up on a client device, then this information would be stored and transmitted while using encryption. Any form of encryption may be used, and more secure forms of encryption may be used in cases where information is deemed very sensitive, such as social security numbers. In an embodiment, only the server is able to decrypt the encryption data.

3.4 Data Retrieval

In an embodiment, data is stored in each of the client devices owned by the user. By storing the backup in multiple client devices, this saves the data in times of catastrophic data loss. For example, the server may fail and lose data as well as one DVR, or client device, of the user. Under this circumstance, the server would be able to have the data restored from another one of the user's client devices. The backup data storage is not limited to only storing the data on the DVR of the user, but may be to any client device of the user. This may include any client device with which the user may interact with the DVR service. This may include, but is not limited to, a portable DVR, a personal computer, and a mobile device, such as a PDA or cellular phone. The integrity of the data is ensured by storing the data in multiple locations. Also, the data may be recovered from yet another client device should multiple devices fail.

If the central data becomes corrupted, then the central data is recovered by retrieving any data that is corrupted from the plurality of client devices. Thus, a small subset of data of the central data may become corrupted or the entire central data may become corrupted, and data is recovered from the client devices in either scenario. In one embodiment, once the central server detects that the entire central data has become corrupted, the server performs an update with any client devices that are in communication with the server. If the information for a particular user is corrupted in the central data, then the client device transmits all information for the particular user to the primary database. This allows all central data lost to be recovered quickly.

In another embodiment, once the central server detects that the central data is corrupted, the central server waits for an update request from each of the client devices in order to retrieve the corrupted data. This process takes longer than the server making update requests but may be less taxing for the central server as the central server may be able to handle only a limited number of connections. The advantage of this embodiment is that the central server only works with data that the server needs because as each client device contacts the server, the server handles that particular client device's needs.

In yet another embodiment, once a central server has detected corruption of the central data, the central server performs update requests for a specified number of client devices until all client devices have been contacted. The selection of which group of client devices to update with first may vary. This may include selecting client devices by geographic region, or by records that indicate which client devices have been most active if that information is available. Limiting the number of connections with the server and client devices ensures that updates and connections are handled properly.

In an embodiment, if the data stored on a client device becomes corrupted, then the data stored previously on the client device is recovered by retrieving data corresponding to the corrupted data from another client device. This may occur where a user owns more than one client device. If the user owns more than one client device, then the backup to the processed data is stored on each of the client devices. Once the client device detects that data has become corrupted, then the client device may send a request to another client device that also stores a backup of the data. This request is limited to devices that the same user owns since stored backups are limited to the subset of data associated with the particular user. In an embodiment, clients are issued a sharing certificate by the server. The sharing certificate informs each client device about other client devices with which the client device is authorized to share data.

Figure 4:
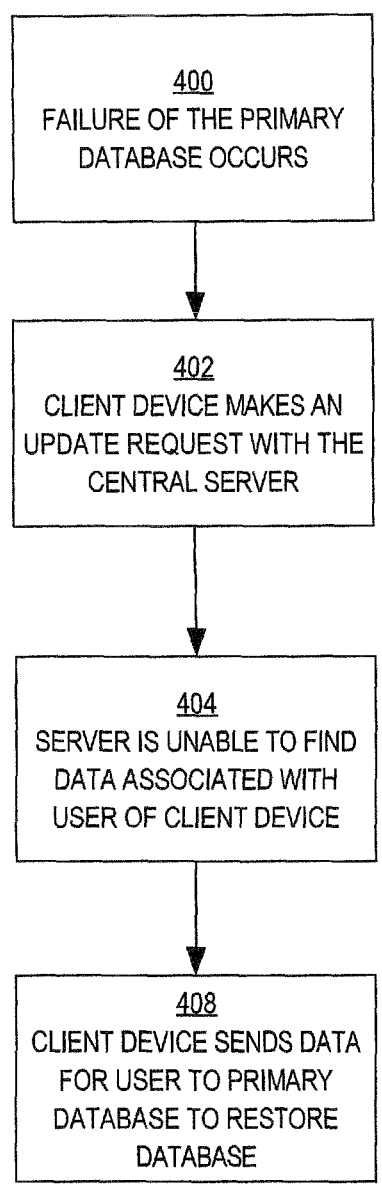
FIG. 4 is a diagram of a flow chart illustrating steps to perform a retrieval of data as a client device comes online, according to an embodiment of the invention.

An illustration of the steps taken for data retrieval as a client comes online, according to an embodiment of the invention, is shown in FIG. 4. In step 400, data is corrupted in the primary database due to the failure of the primary database. In step 402, one of the client devices makes An update request subsequent to the detection of corrupted data. The central server takes the request and compares the states of data stored on the primary database and the client device. In this particular circumstance as shown in step 404, no data associated with the user is found on the primary database because of the corruption. In step 406, data is restored for the particular client device by the client device sending all backup data to the primary database. These data retrieval steps are repeated upon detection of data corruption for each particular user's one or more client devices as the client devices make an update request with the central server.

4.0 Distributed Backup on Enterprise Systems

Distributed backup may be used with any enterprise network system and is not limited to only systems for DVR service providers. Enterprise systems that have a central server with many clients may implement this backup system. Enterprise systems present the same difficulties because large amounts of data must be stored with an adequate backup system. Removing the need for a backup to a single, large database presents many cost savings.

Any type of system that comprises a central server with many clients over a network may use distributed backup. For example, in a cell phone network or personal computer network where users subscribe to a centralized service, backup of the central data becomes critical.

The techniques and methods of distributed backup may be applied to any enterprise system or system employing a central server. Subsets of data stored with the central server and database are stored as a backup in the clients of the enterprise system. Any type of data may be backed up in this way, including, but not limited to, corporate records, customer data, or human resources information. Updates are performed often in order to ensure that the data stored as the backup is current. If the data is considered sensitive, the data and transmission of the data are encrypted for privacy. Upon the detection of data corruption at the primary database, data may be recovered from the clients. Also, upon the detection of data corruption at one of the client devices, a new backup may be stored on the repaired client with data from the primary database.

5.0 Example Embodiments

According to an embodiment, a method comprises: maintaining a set of data by a service, comprising one or more servers, that provides services to a plurality of client devices; wherein the set of data includes a plurality of subsets of data; storing subsets of the set of data in the plurality of client devices; wherein the step of storing the subsets of the set of data in the plurality of client devices includes, for each particular client device of the plurality of client devices, determining a subset of data that should be stored in the particular client device and sending the subset of data to the particular client device for storage in the particular client device; detecting corruption in the set of data; and in response to detecting corruption in the set of data, restoring the set of data from the subsets of data stored in the plurality of client devices.

In an embodiment, maintaining the set of data further comprises: receiving an indication of a state of the subset of data stored on the particular client device; and sending data for storage on the particular client device based on the indication. In an embodiment, at least one of the client devices is a DVR, a mobile device, or a personal computer. In an embodiment, at least one subset of data is stored in the plurality of client devices in an encrypted state. In an embodiment, data is sent using encrypted transmissions. In an embodiment, the subset of data stored on a particular device is associated with a user who controls the particular device.

6.0 Implementation Mechanisms

Figure 5:
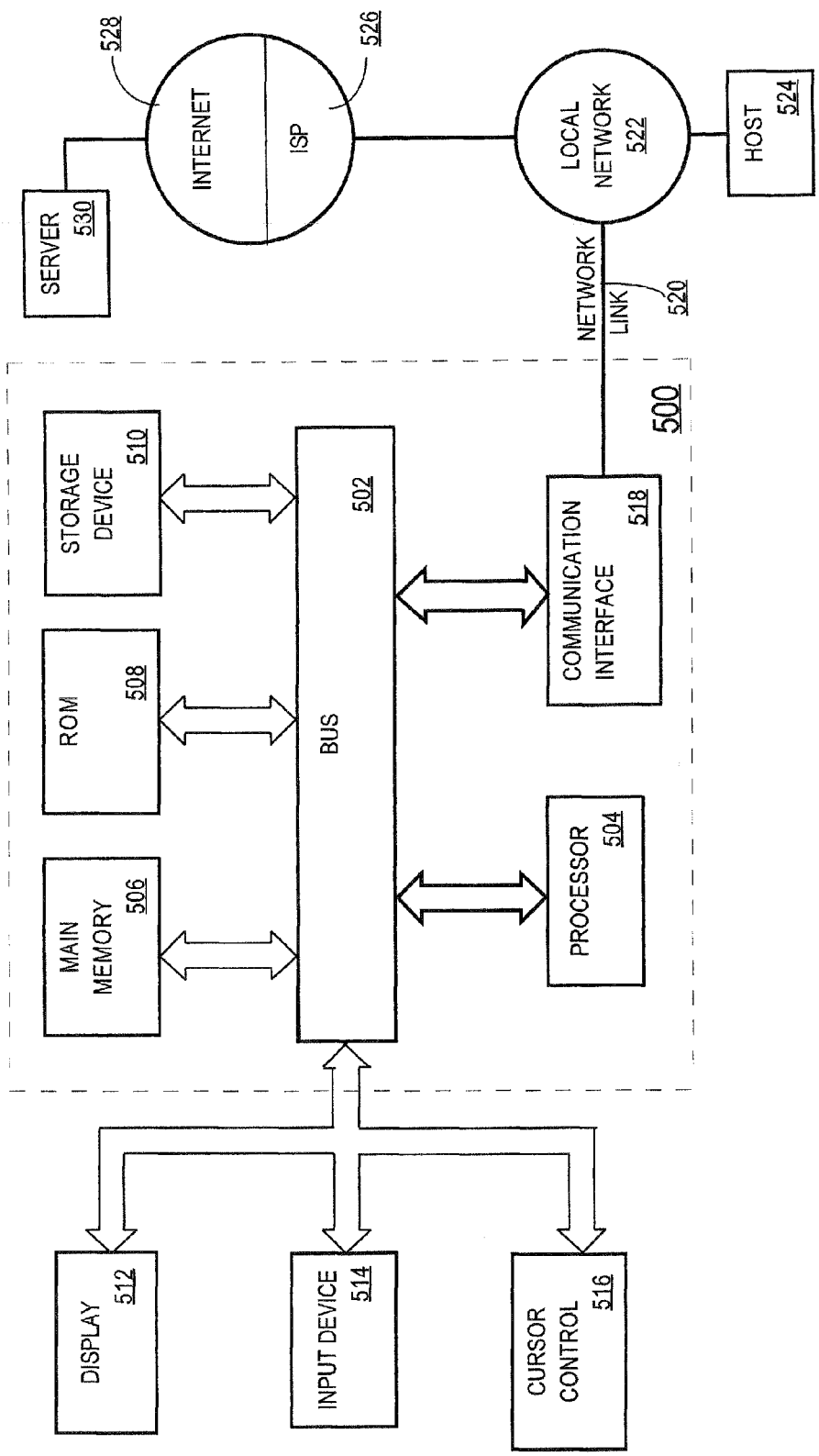
FIG. 5 is a block diagram of a system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving, at a first client device, an encrypted copy of server operating data for a user of a service provided by a server, the server configured to utilize the server operating data to provide the service to the user, the user being one of a plurality of users of the service, the first client device being one of a plurality of client devices to which the server is configured to provide the service;
storing, at the first client device, the encrypted copy of the server operating data for the user, wherein the server operating data is associated with the user who controls the first client device and wherein the server operating data changes based on an action of the user on the first client device;
determining whether a second client device of the plurality of client devices is associated with the same user who controls the first client device;
in response to determining that the second client device is associated with the same user who controls the first client device, storing, on the second client device, the encrypted copy of the server operating data for the user that is also stored on the first client device;
at the first client device, requesting and accessing the service provided by the server, in association with the user;
receiving, at the first client device, updates to the server operating data for the user;
updating the encrypted copy of the server operating data stored at the first client device responsive to the updates;
receiving, at the first client device, a request from the server for at least a portion of the encrypted copy of the server operating data for the user;
sending, by the first client device, at least the portion of the encrypted copy of the server operating data for the user back to the server.

2. The method of claim 1, wherein the services are media content related services, wherein the first client device is a digital video recorder ("DVR") to which the server provides the media content related services based on media content metadata collected in the server operating data for the user.

3. The method of claim 1, wherein the first client device sends the portion of the encrypted copy of the server operating data back to the server without having decrypted the encrypted copy of the server operating data for the user.

4. The method of claim 1, wherein the server operating data includes one or more of: lists of downloaded or purchased content, high scores of games played, user preferences, or user account information.

5. The method of claim 1, wherein the user is a first user of a group of users that operates the first client device, wherein the method further comprises:
   receiving, at the first client device, an encrypted copy of second server operating data for a second user of the service provided by the server;
   storing, at the first client device, the encrypted copy of the second server operating data for the second user;
   at the first client device, requesting and accessing the service provided by the server in association with second user.

6. The method of claim 1, further comprising:
   detecting, by the first client device, that the encrypted copy of the server operating data stored at the first client device has become corrupted;
   requesting, by the first client device, another encrypted copy of the server operating data from a second client device associated with the user.

7. The method of claim 1, wherein the first client device is a cellular phone or portable media player.

8. An apparatus, comprising:
   a hardware that receives, at a first client device, an encrypted copy of server operating data for a user of a service provided by a server, the server configured to utilize the server operating data to provide the service to the user, the user being one of a plurality of users of the service, the first client device being one of a plurality of client devices to which the server is configured to provide the service;
   a hardware that stores, at the first client device, the encrypted copy of the server operating data for the user, wherein the server operating data is associated with the user who controls the client device and wherein the server operating data changes based on an action of the user on the first client device;
   a hardware that determines whether a second client device of the plurality of client devices is associated with the same user who controls the first client device;
   a hardware that in response to determining that the second client device is associated with the same user who controls the first client device, stores, on the second client device, the encrypted copy of the server operating data for the user that is also stored on the first client device;
   a hardware, at the first client device, that requests and accesses the service provided by the server, in association with the user;
   a hardware that receives, at the first client device, updates to the server operating data for the user;
   a hardware, that updates the encrypted copy of the server operating data stored at the first client device responsive to the updates;
   a hardware that receives, at the first client device, a request from the server for at least a portion of the encrypted copy of the server operating data for the user;
   a hardware, that sends, by the first client device, at least the portion of the encrypted copy of the server operating data for the user back to the server.

9. The apparatus of claim 8, wherein the services are media content related services, wherein the apparatus is a digital video recorder ("DVR") to which the server provides the media content related services based on media content metadata collected in the server operating data for the user.

10. The apparatus of claim 8, wherein the first client device is further configured to send the portion of the encrypted copy of the server operating data back to the server without having decrypted the encrypted copy of the server operating data for the user.

11. The apparatus of claim 8, wherein the server operating data includes one or more of: lists of downloaded or purchased content, high scores of games played, user preferences, or user account information.

12. The apparatus of claim 8, wherein the user is a first user of a group of users that operates the first client device, wherein the apparatus further comprises:
   a hardware that receives, at the first client device, an encrypted copy of second server operating data for a second user of the service provided by the server;
   a hardware that stores, at the first client device, the encrypted copy of the second server operating data for the second user;
   a hardware, at the first client device, requests and accesses the service provided by the server in association with second user.

13. The apparatus of claim 8, wherein the apparatus is the first client device associated with the user, the apparatus further comprising:
   a hardware that detects that the encrypted copy of the server operating data stored at the first client device has become corrupted;
   a hardware that requests, by the first client device, another encrypted copy of the server operating data from a second client device associated with the user.

14. The apparatus of claim 8, wherein the apparatus is a cellular phone or portable media player.

15. One or more non-transitory computer-readable media storing one or more instructions which, when executed by one or more computing devices, cause:
   receiving, at a first client device, an encrypted copy of server operating data for a user of a service provided by a server, the server configured to utilize the server operating data to provide the service to the user, the user being one of a plurality of users of the service, the first client device being one of a plurality of client devices to which the server is configured to provide the service;
   storing, at the first client device, the encrypted copy of the server operating data for the user, wherein the server operating data is associated with the user who controls the first client device and wherein the server operating data changes based on an action of the user on the first client device;
   determining whether a second client device of the plurality of client devices is associated with the same user who controls the first client device;
   in response to determining that the second client device is associated with the same user who controls the first client device, storing, on the second client device, the encrypted copy of the server operating data for the user that is also stored on the first client device;
   at the first client device, requesting and accessing the service provided by the server, in association with the user;
   receiving, at the first client device, updates to the server operating data for the user;
   updating the encrypted copy of the server operating data stored at the first client device responsive to the updates;
   receiving, at the first client device, a request from the server for at least a portion of the encrypted copy of the server operating data for the user;

sending, by the first client device, at least the portion of the encrypted copy of the server operating data for the user back to the server.

16. The one or more non-transitory computer-readable media of claim 15, wherein the services are media content related services, wherein the first client device is a digital video recorder ("DVR") to which the server provides the media content related services based on media content metadata collected in the server operating data for the user.

17. The one or more non-transitory computer-readable media of claim 15, wherein the first client device sends the portion of the encrypted copy of the server operating data back to the server without having decrypted the encrypted copy of the server operating data for the user.

18. The one or more non-transitory computer-readable media of claim 15, wherein the server operating data includes one or more of: lists of downloaded or purchased content, high scores of games played, user preferences, or user account information.

19. The one or more non-transitory computer-readable media of claim 15, wherein the user is a first user of a group of users that operates the first client device, wherein the instructions, when executed by the one or more computing devices, further cause:

receiving, at the first client device, an encrypted copy of second server operating data for a second user of the service provided by the server;

storing, at the first client device, the encrypted copy of the second server operating data for the second user;

at the first client device, requesting and accessing the service provided by the server in association with second user.

20. The one or more non-transitory computer-readable media of claim 15, wherein the instructions, when executed by the one or more computing devices, further cause:

detecting, by the first client device, that the encrypted copy of the server operating data stored at the first client device has become corrupted;

requesting, by the first client device, another encrypted copy of the server operating data from a second client device associated with the user.

21. The one or more non-transitory computer-readable media of claim 15, wherein the first client device is a cellular phone or portable media player.

* * * * *

UNITED STATES PATENT AND TRADEMARK OFFICE
CERTIFICATE OF CORRECTION

PATENT NO. : 9,807,064 B2
APPLICATION NO. : 15/012796
DATED : October 31, 2017
INVENTOR(S) : James Barton et al.

It is certified that error appears in the above-identified patent and that said Letters Patent is hereby corrected as shown below:

On the Title Page

In Item (73) please change "Solutioins" to -- Solutions --

Signed and Sealed this
Thirteenth Day of March, 2018

Andrei Iancu
*Director of the United States Patent and Trademark Office*